United States Patent
Graell Moore et al.

(10) Patent No.: US 10,865,461 B2
(45) Date of Patent: Dec. 15, 2020

(54) METHOD FOR REMOVING ARSENIC FROM MATERIALS CONTAINING SAME

(71) Applicant: Molibdenos y Metales S.A., Santiago (CL)

(72) Inventors: John Patrick Graell Moore, Santiago (CL); Manuel Enrique Guzman Manzo, Santiago (CL); Cristian Eduardo Pizarro Herrera, Santiago (CL); Christian Ignacio Soto Infante, Santiago (CL)

(73) Assignee: MOLIBDENOS Y METALES S.A., Santiago (CL)

( * ) Notice: Subject to any disclaimer, the term of this patent is extended or adjusted under 35 U.S.C. 154(b) by 342 days.

(21) Appl. No.: 15/753,827

(22) PCT Filed: Sep. 2, 2015

(86) PCT No.: PCT/CL2015/050038
§ 371 (c)(1),
(2) Date: Feb. 20, 2018

(87) PCT Pub. No.: WO2017/035675
PCT Pub. Date: Mar. 9, 2017

(65) Prior Publication Data
US 2018/0245179 A1 Aug. 30, 2018

(51) Int. Cl.
C22B 15/00 (2006.01)
C22B 3/12 (2006.01)
C22B 30/04 (2006.01)

(52) U.S. Cl.
CPC .............. *C22B 15/008* (2013.01); *C22B 3/12* (2013.01); *C22B 30/04* (2013.01); *Y02P 10/20* (2015.11)

(58) Field of Classification Search
CPC ......... C22B 15/008; C22B 3/12; C22B 30/04; Y02P 10/234; Y02P 10/236
USPC .......................................................... 423/87
See application file for complete search history.

(56) References Cited

U.S. PATENT DOCUMENTS

| | | |
|---|---|---|
| 3,911,078 A | 7/1975 | Nadkarni et al. |
| 5,993,635 A | 11/1999 | Hourn et al. |
| 8,771,619 B2 | 7/2014 | Nakon et al. |
| 2007/0253877 A1 | 1/2007 | Fujita et al. |

FOREIGN PATENT DOCUMENTS

| | | |
|---|---|---|
| CN | 104120274 | 10/2014 |
| CN | 103849782 | 12/2014 |
| CN | 104451198 | 3/2015 |
| CN | 103255289 | 4/2015 |
| EP | 2042472 | 4/2009 |
| JP | 2006341139 A | 12/2006 |

OTHER PUBLICATIONS

International Preliminary Report on Patentability for App. Ser. No. PCT/CL2015/050038, dated Feb. 3, 2017, 13 pages (with English translation).
Baláž et al., "Mechano-chemical leaching in hydrometallurgy of complex sulphides," *Hydrometallurgy*, 2006;84:60-68.
Camacho et al., "Arsenic stabilizatien on water treatment residuals by calcium addition," *Journal of Hazardous Materials*, Jun. 2009;165(1-3):599-603.
De Mihajlovic et al., "Potential method for arsenic removal from copper concentrates," *Minerals Engineering*, 2007;20(1):26-33.
Guo et al., "A comparative study on treatment of impure acid with low-concentration arsenic," *Chinese Journal of Environmental Engineering*, Mar. 2013;7(3):1005-1009.
Jia et al., "Coprecipitation of arsenate with iron(III) in aqueous sulfate media: Effect of time, lime as base and co-ions on arsenic retention," *Water Research*, Feb. 2008;42(3):661-668.
Laky et al., "Arsenic removal by ferric-chloride coagulation—Effect of phosphate, bicarbonate and silicate," *Water Science and Technology*, 2011;64(5):1046-1055.
Pakzadeh et al., "Surface complexation modeling of the removal of arsenic from ion-exchange waste brines with ferric chloride," *Journal of Hazardous Materials*, Apr. 15, 2011;188(1-3):399-407.
Pantuzzo et al., "New evidences for the role of preciptation and adsorption during Fe(III)—As(V) coprecipitation," *Hydrometallurgy*, 2008 Proceedings of the 6$^{th}$ International Symposium, 2008;130-139.
Park et al., "Selective removal of arsenic(V) from a molybdate plant liquor by preciptation of magnesium arsenate," *Hydrometallurgy*, Sep. 2010;104(2):290-297.
Ragavan et al., "Co-precipitation model coupled with prediction model for the removal or arsenic from ground and surface waters using lanthanides," *Nuclear Materials*, 2011;1-46.
Safarzadeh et al., "Recent trents in the processing of enargite concentrates," *Mineral Processing and Extractive Metallurgy Review*, 2014;35(5):283-367.
Tongamp et al., "Arsenic removal from copper ores and concentrates through alkaline leaching in NaHS media," *Hydrometallurgy*, 2009;98(3-4):213-218.
Tongamp et al., "Precipitation of arsenic as $Na_3AsS_4$ from $Cu_3AsS_4$—NaHS—NaOH leach solutions," *Hydrometallurgy*, 2010;105(1-2):42-46.
International Search Report and Written Opinion dated Mar. 3, 2016 in PCT/CL2015/050038, 8 pgs.

*Primary Examiner* — Steven J Bos
(74) *Attorney, Agent, or Firm* — Fox Rothschild LLP

(57) ABSTRACT

Disclosed is a method for the removal of arsenic from materials containing a high arsenic content, or materials containing a high content of arsenic and selenium.

19 Claims, 3 Drawing Sheets

METHOD FOR REMOVING ARSENIC FROM MATERIALS CONTAINING SAME

FIELD OF APPLICATION

Elements such as arsenic and selenium are considered contaminants in the production of copper.

The copper concentrates exploited commercially by the large mining companies (metal sulfides) contain increasingly higher arsenic levels (>0.5%), which means that they cannot be sent directly to the smelter without breaking the environmental regulations regarding the arsenic content of the gases emitted from smelting. One way to solve the problem of the high arsenic content in smelting is through mixing with concentrates with a low arsenic content. Nevertheless, the supply of low-arsenic concentrates is increasingly more scarce, which makes mixing difficult. A great deal of research and development effort has been put into solving this problem to allow mining companies to continue on the path of productivity and competitiveness. However, the industry still has no competitive process or dominant technology that would enable copper concentrates with a high arsenic content to be treated.

Other materials in the copper industry with a high arsenic content, such as cement and filter powders from smelting or roasting, also require processes to reduce their arsenic content to very low levels so that they can be sold or recycled. This constitutes a technological and process challenge.

Other materials with a high arsenic content and with a mineralogy similar to that of the compounds mentioned above, such as those in gold mining, require processes to reduce their arsenic content.

Materials from the copper industry with a high selenium content, or a high content of both selenium and arsenic, also require processes that reduce their arsenic and/or selenium content.

SUMMARY OF THE INVENTION

The process described in this application consists of selectively lixiviating the arsenic present in the copper concentrates and in other materials containing arsenic, with an efficiency higher than 90%, thereby obtaining a stable solid compound with an arsenic concentration less than or equal to 0.5%. The lixiviation is carried out in an alkaline medium using a reactor with an overpressure of air or pure oxygen at a temperature of 100-220° C. and for times of 0.5-2.5 hours. Afterwards, a solid-liquid separation is carried out to obtain a solid with a low arsenic content that meets commercial specifications or that allows its recycling or mixing in the production process and a solution that contains dissolved arsenic in its +5 oxidation state in the form of arsenate ($AsO_4^{3-}$). Said solution is subjected to a process of removal of dissolved arsenic through the addition of reagents that enable an environmentally stable precipitate to be obtained.

Furthermore, the process is applicable to materials that contain arsenic and/or selenium, lixiviating each one selectively. If selenium is present, it follows the same route as the arsenic insofar as it is present in the solutions. The removal methods leave it in the same precipitates as the arsenic.

The process considers the partial or total recirculation of the alkaline solution so as to optimize reagent consumption. Sodium sulfate is also generated in the process. This may be disposed of or recovered by crystallization or a similar process with the aim of recycling water and obtaining a byproduct.

STATE OF THE ART

The demand for copper has increased over the last years and is expected to keep on growing. This has promoted the development of processes that enable the treatment of copper concentrates with increasingly higher arsenic levels.

The arsenic content of copper concentrates has been generally increasing, and so strategies of mixing concentrates to achieve levels below 0.5% As, the maximum concentration permissible in smelters, are no longer possible. This situation will have a negative effect on the productivity, profitability and competitiveness of mining companies worldwide.

Arsenic is found in copper ores mostly in the form of enargite ($Cu_3AsS_4$) and, to a lesser degree tennantite ($Cu_{12}As_4S_3$). Arsenic can also be found in other minerals in sulfide form, such as AsS, $As_2S_3$ or other arsenic sulfides, as well as in iron ores such as arsenopyrite (FeAsS). Moreover, in other materials such as roasting or smelting filter powders, arsenic can be present as an oxide, such as arsenolite ($As_2O_3$). Considerable research effort has been put into the treatment of concentrates that contain these mineralogical arsenic species, which represent a great challenge both for the decontamination of the concentrate and for the stabilization of the arsenic, which must be disposed of in a stable manner. Pyrometallurgical and hydrometallurgical routes are proposed in the literature. Pyrometallurgical treatments produce volatile arsenic compounds which enter the gaseous phase of the system. These are very harmful for the environment and difficult to treat economically. For this reason, the industry prefers the use of hydrometallurgical processes. Research (at the laboratory and pilot scales) has been oriented towards the development of this type of process, especially various types of lixiviation (selective, total, alkaline, acid, at atmospheric pressure or under overpressure).

At the present time there is no dominant technology at the industrial level that enables the problem to be solved, and those that have been installed have not given the expected results.

Among the hydrometallurgical treatments, there are two routes for processing copper concentrate with a high arsenic content: acid lixiviation and alkaline lixiviation. Acid lixiviation generally uses sulfuric acid ($H_2SO_4$) as a lixiviating agent, and the lixiviation is carried out at atmospheric pressure in the majority of cases. Under these circumstances in which acid lixiviation treatments are used, the dissolution of arsenic from the concentrate is not selective. This means that, as well as lixiviating arsenic from the sulfide material, elements of interest such as copper are also lixiviated. For example, in the case of U.S. Pat. No. 5,993,635, the Albion Process, up to 95% of the copper contained in the ore was lixiviated, along with cobalt, nickel and zinc, using a lixiviating solution composed of 30-80 g/L of sulfuric acid and 5-30 g/L of ferric ion, at temperatures ranging from 60° C. to the boiling point of the pulp, bubbling oxygen, enriched air or air at the rate of 400-1000 kg $O_2$/ton of metal produced. The reaction times for this process are approximately 10 hours, showing that the reaction kinetics of these processes tend to be slow. The predominant chemical reactions for this process are the following:

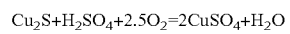

$$Cu_2S + H_2SO_4 + 2.5O_2 = 2CuSO_4 + H_2O \qquad \text{i.}$$

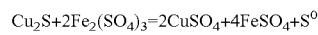

$$Cu_2S + 2Fe_2(SO_4)_3 = 2CuSO_4 + 4FeSO_4 + S^0 \qquad \text{ii.}$$

$$2Cu_3AsS_4+11Fe_2(SO_4)_3+8H_2O=6CuSO_4+2H_3AsO_4+ \\ 5H_2SO_4+8S^0+22FeSO_4 \qquad \text{iii.}$$

Given that the process does not selectively dissolve the arsenic, when working with copper concentrates, it is necessary to introduce additional treatments to separate the arsenic from the valuable elements of the sulfide ore so as then to be able to extract and refine the copper by traditional methods of solvent extraction (SX) and electrowinning (EW).

In this way, if complete dissolution of the sulfide ore is desired, acid lixiviation is the most convenient solution.

With respect to alkaline lixiviation hydrometallurgical treatments, there is sufficient evidence to show its utility for processes that search the selective dissolution of arsenic from sulfide materials. The reagents for carrying out the lixiviation that have been studied are mixtures of NaOH with the following reagents: NaHS or $Na_2S$, giving reducing conditions; or NaClO, giving oxidizing conditions.

The processes that use NaHS or $Na_2S$ as lixiviating agents are characterized by their high selectivity.

For processes that use NaHS, the chemical reaction is the following:

$$2Cu_3AsS_4(s)+3NaHS(aq)+3NaOH(aq)=2Na_3AsS_4 \\ (aq)+3Cu_2S(s)+3H_2O \qquad \text{iv.}$$

On the other hand, for processes that use $Na_2S$, the chemical reaction is the following:

$$2Cu_3AsS_4(s)+3Na_2S(aq)=3Cu_2S(s)+2Na_3AsS_4(aq) \qquad \text{v.}$$

For the process using NaHS as the lixiviating agent, the work of Tongamp, W.; Takasaki, Y.; Shibayama, A. Arsenic Removal from Copper Ores and Concentrates Through Alkaline Leaching in NaHS Media. *Hydrometallurgy* 2009, 98 (3-4), 213-218, provides an extraction of over 95% of the arsenic from the initial material by adding NaHS in a range of 0.68-1.35 M with respect to sulfide and NaOH at 1.25 M with respect to hydroxide. The times studied ranged up to 120 minutes with a working temperature of up to 90° C.

For the use of $Na_2S$, the MELT process (Baláž, P.; Achinnovičová, M. Mechano-chemical Leaching in Hydrometallurgy of Complex Sulphides. *Hydrometallurgy* 2006, 84, 60-68) also adds a material pre-treatment step, with mechanical activation before lixiviation. In the study, the $Na_2S$ feed was 100 g/L and that of NaOH was 50 g/L, operating at 90° C. with a liquid-solid ratio of 400. In 30 minutes, the extraction of arsenic was 67% without mechanical activation; this rose to 92% with the pre-treatment.

In the case of the Xstrata patent U.S. Pat. No. 8,771,619 B2, "Method for Treating Arsenic Containing Materials", the feed conditions for $Na_2S$ and NaOH are up to 140 g/L and 250 g/L respectively, with a percentage of solid in the pulp of 25-50%. The extraction is good insofar as the arsenic content in the final solid is less than 0.5%; however, to reach this value, the residence times are in the range of 4-8 hours, showing the slow kinetics of the chemical reactions. In the same document, in Table 2, Trials 4, 5 and 6, the use of NaOH as the sole lixiviating agent is given as an example: this attempts to maintain highly reducing conditions in the solution with the aim of generating $Na_2S$ in situ, which generates solutions with very negative potentials that maintain the arsenic in reduced form. In the process of the present application, the use of NaOH is always accompanied by the use of gaseous $O_2$ (air or pure oxygen), which favors the formation of arsenic in its +5 oxidation state as arsenate ($AsO_4^{3-}$), a fundamental difference from the process described in the Xstrata patent. Furthermore, it should be emphasized that another fundamental difference between the two processes is the dissolution kinetics observed. While the process described in the Xstrata patent is of the order of 4-8 hours, kinetics of 0.5-2.5 hours are obtained in the present application.

As can be understood, the principal characteristic of these processes is that the chemical reactions show high conversions, operating generally at atmospheric pressure is and at temperatures below 90° C., which favors a reducing environment and the formation of the soluble compound $Na_3AsS_4$. These processes also require high concentrations of reagents in the pulp to obtain favorable conditions for the chemical reactions; nevertheless, the liquors generated can be recirculated after treatment to precipitate the arsenic. Although the selectivity of these processes is high, more research is necessary to clarify how to stabilize the arsenic in a reliable and safe form starting from the compound $Na_3AsS_4$, as this is toxic and cannot be disposed of, as is mentioned in the work of Safarzadeh, M. S.; Moats, M. S.; Miller, J. D. Recent Trends in the Processing of Enargite Concentrates. Min. Process. Extract. Metall. Rev. 2014, 35 (5), 283-367. There is no industrially validated method for the efficient precipitation of $Na_3AsS_4$ that forms a stable arsenic compound for safe disposal. There are studies such as that of Tongamp, W.; Takasaki, Y.; Shimbayama, A. Precipitation of Arsenic as $Na_3AsS_4$ from $Cu_3AsS_4$— NaHS—NaOH Leach Solutions. *Hydrometallurgy* 2010, 105 (1-2), 42-46, in which $Na_3AsS_4$ is precipitated by adding elemental sulfur, obtaining efficiencies in the order of 60%. Therefore, NaHS and $Na_2S$ can still not be used industrially as lixiviating agents to remove arsenic from sulfide materials with subsequent disposal in a safe form.

Another interesting alternative is the process of lixiviation with NaClO at atmospheric pressure in an oxidizing environment, such as in the work of Mihajlovic, I.; Strbac, N.; Zivkovik, Z.; Kovacevic, R.; Stehernik, M. A Potential Method for Arsenic Removal from Copper Concentrates. *Min. Eng.* 2007, 20 (1), 26-33. Good dissolution kinetics were obtained in this work. In this way, CuO and arsenate ions are obtained; the latter dissolve completely in the mother liquor. The chemical reaction that defines this process is the following:

$$2Cu_3AsS_4(s)+35NaClO(aq)+22NaOH(aq)=6CuO(s)+ \\ 2Na_3AsO_4(aq)+8Na_2SO_4(aq)+35NaCl(aq)+ \\ 11H_2O$$

The results of this process indicate a removal of 99% of the arsenic at a temperature of 60° C., with a range of residence times of up to 120 minutes. The concentration of NaClO is 0.3 M, to which is added 0.05 g/L of NaOH so that the working pH is close to 12. The liquid-solid ratio in this process is 1600. There are two problems with this process: the high consumption of NaClO, which increases the cost of treatment; and the fact that it is not possible to use it when the copper concentrate has high levels of covellite (CuS), as this compound is soluble in a $ClO^-/OH^-$ medium. This process has not been applied on an industrial level.

It can be concluded that, for the case of elimination of arsenic from copper concentrates, the alternative of alkaline lixiviation in an oxidizing environment offers the best possibilities for successful results. On the one hand, alkaline lixiviation has the characteristic of being selective, that is it only promotes the dissolution of arsenic from the sulfide ore without lixiviating species of interest such as copper, gold and silver. On the other hand, if the alkaline lixiviation environment is oxidizing, the formation of the arsenate ion ($AsO_4^{3-}$) is favored. This is a compound that can be precipitated, producing compounds that are chemically stable and suitable for safe disposal.

Moreover, the liquors resulting from high-pressure alkaline lixiviation of copper concentrates and other materials with a high arsenic content can reach concentrations of up to 20.0 g/L. This becomes a major problem as the high arsenic content limits the recirculation of liquor due to the apparent accumulation of arsenic in the system. Neither can it be discarded because of environmental impact regulations.

The precipitation of arsenic can be carried out by various techniques. The most widely used and studied are the following: precipitation-coagulation (or co-precipitation) of insoluble arsenic species, adsorption, electrical techniques (electrocoagulation, electrodialysis and others), nanofiltration, reduction and oxidation.

Precipitation techniques are mainly used to remove large quantities of arsenic in solution (of the order of several g/L) but generally do not in themselves allow the environmental requirements (in the order of mg/L) to be met.

Oxidation techniques, rather than being techniques in themselves, are pretreatments for precipitation techniques. If the arsenic is predominantly $As^{5+}$, precipitation techniques are effective in removing the larger part. If the arsenic is predominantly $As^{3+}$, precipitation techniques do not work well in themselves and require an oxidative pretreatment to convert the $As^{3+}$ to $As^{5+}$.

Reduction techniques are generally used when the system has very low potentials that enable the reduction of $S^0$ to sulfides ($S^{2-}$), and seek to precipitate the arsenic in the form of sodium thioarsenate by adding elemental sulfur. In general, these do not give good levels of arsenic removal (around 60%), given that sodium thioarsenate is partially soluble, and are only used when partial elimination of the arsenic is required so as to recirculate the alkaline solution while avoiding saturation.

In the enargite lixiviation studies found in the literature, reduction is generally used as a way of reducing the arsenic in solution to be able to recirculate the solution, which still contains significant quantities of soda. This is because the potential of the outlet solution is very low and the objective is not to remove the arsenic completely. The main disadvantages are the cost of using elemental sulfur and the low removal of arsenic achieved, meaning that the elimination process must be repeated several times to avoid saturating the solution. Finally, there is the question of what to do with the solid generated.

As for the arsenic removal techniques analyzed in the present invention, the following may be noted:

Use of REE (rare earth elements): Information is present both in scientific publications and in patents. The Japanese patent JP 2006/341139A includes an optimum pH range of 8-11. In the document Ragavan, A. J.; Adams, D. V. Co-precipitation Model Coupled with Prediction Model for the Removal of Arsenic from Ground and Surface Waters Using Lanthanides. *Nucl. Mat.* 2011, 1-46, it was concluded that the use of lanthanides was pertinent in reducing the arsenic to levels below those permitted in drinking water. In the studies carried out in the present invention, it was concluded that having silicon (Si) in the solution caused it to precipitate together with the arsenic and the REE. There is no information about this latter point in the literature. There is no information about the stability of the solids generated, and so at the present time it is impossible to conclude whether or not they can be disposed of.

Use of magnesium: Information is present both in scientific publications and in patents. In the document Park, Y. Y.; Tran, T.; Lee, Y. H.; Nam, Y. I.; Senanayake, G.; Kim, M. J. Selective Removal of Arsenic(V) from a Molybdate Plant Liquor by Precipitation of Magnesium Arsenate. *Hydrometallurgy* 2010, 104 (2), 290-297, residual As concentrations of <5 ppm are reported for an Mg/As molar ratio of 2 and pH 10.2. The documents that show good results for the removal of arsenic all have ammonia in solution, which is not the case the present invention. In the laboratory trials of the present invention, the same optimal pH reported in the literature was obtained but the same removal efficiencies were not achieved, presumably due to the absence of ammonium ions in solution. There is no information about the stability of the solids generated, and so at the present time it is impossible to conclude whether or not they can be disposed of.

Use of iron: Information is present both in scientific publications and in patents. In the document Pakzadeh, B.; Batista, J. R. Surface Complexation Modeling of the Removal of Arsenic from Ion-Exchange Waste Brines with Ferric Chloride. *J. Hazard. Mat.* 2011, 188 (1-3), 399-407, the use of a pH window of 4.5-6.5 for ion-exchange waste brines is reported, using an Fe/As molar ratio of 1.3-1.7. In the document Pantuzzo, F. L.; Ciminelli, V. S. T.; De Brito, W. New Evidences for the Role of Precipitation and Adsorption During Fe(III)-As(V) Coprecipitation. *Hydrometallurgy* 2008, Proceedings of the 6th International Symposium 2008, 130-139, it is reported that for an Fe/As molar ratio of 4 and a pH of 4-8, the elimination of arsenic is greater than 99%, with the quantity of arsenic precipitated and adsorbed varying according to the pH. In the document Laky, D.; Licskó, I. Arsenic Removal by Ferric Chloride Coagulation—Effect of Phosphate, Bicarbonate and Silicate. *Water Sci. Tech.* 2011, 64 (5), 1046-1055, it is reported that if the content of silicon as silicate is high in the solution, the solid generated shows filtration problems requiring the coagulate dose to be increased 2.5-3.5 times, which is in agreement with the experimental evidence obtained in this invention. The removals that had been obtained in the trials of the present invention were higher than those reported for an optimum pH equal to 8, although with a higher dose. The majority of documents conclude that the solid precipitated (scorodite) is unstable and requires a stabilizer if it is to be disposed of.

Use of iron and calcium: information is present both in scientific publications and in patents. The majority of documents consulted report an optimum pH of 8. In the document Guo, L.; Cui, J.; Chen, D.; Du, D. A Comparative Study on Treatment of Impure Acid with Low-Concentration Arsenic. *Chin. J. Environ. Eng.* 2013, 7 (3), 1005-1009, a residual arsenic concentration of <1 ppm is reported for a Ca/As molar ratio >6 and Fe/As >8. In the present invention, practically the same removal is achieved with a lower dose and the same optimum pH. In the documents Jia, Y.; Demopoulos, G. P. Coprecipitation of Arsenate with Iron (III) in Aqueous Sulfate Media: Effect of Time, Lime as Base and Co-ions on Arsenic Retention. *Water Res.* 2008, 42 (3), 661-668 and Ca macho, J.; Wee, H.-Y.; Kramer, T. A.; Autenrieth, R. Arsenic Stabilization on Water Treatment Residuals by Calcium Addition. *J. Hazard. Mat.* 2009, 165 (1-3), 599-603, it was concluded that calcium is important as a stabilizer of the iron-arsenic precipitate, forming some sort of a $Ca^{2+}Fe^{3+}As^{5+}$ combination. The solid formed is stable and can be disposed of as long as direct contact with ambient $CO_2$ is avoided as this could decompose it in the long term. If contact with $CO_2$ cannot be avoided, it is reported that the solid can be stabilized using Portland cement.

The study of the state of the art shows that there are various techniques to remove the arsenic from lixiviation solutions of enargite and tennantite, the majority of which start from solutions in acid media.

In the case of lixiviation solutions of enargite and tennantite in alkaline media, the reduction potentials are very low, which allows the use of elemental sulfur to precipitate the arsenic as thioarsenate. These compounds are not considered stable for final disposal and the precipitation efficiency is relatively low, about 60%.

In the case of the process that is the subject of the present application, the solutions show a relatively high potential, as the arsenic is present as arsenate ($As^{5+}$) and at a high concentration (up to 20 g/L). This allows the effective precipitation of arsenic with various reagents.

The precipitation techniques studied in relation to the present application consist of the use of $Ce^{3+}$, $Fe^{3+}$ and $Mg^{2+}$ cations, and the combination of $Fe^{3+}$ and $Ca^{2+}$, as precipitating agents. In particular, the following compounds that contain said cations are used as precipitating reagents: $CeCl_3$, $MgSO_4$, $Fe_2(SO_4)_3$ and $Fe_2(SO_4)_3+Ca(OH)_2$.

Of the precipitation techniques, the use of iron and calcium was shown to be the most promising for low levels of residual arsenic and better stability of the precipitate.

The high efficiency of the precipitation of arsenic with iron and calcium enables a high recirculation of the alkaline solution without reaching saturation in arsenic, which represents an improvement with respect to the processes reported in literature, in which the removal is less efficient, limiting the recirculation of the alkaline solution.

It is concluded that the combination of the alkaline lixiviation process for materials containing a high arsenic content with control of the production potential to obtain the arsenic in solution as arsenate allows the application of the precipitation technique with iron and calcium, which is novel in this type of lixiviation.

The complete process of selective lixiviation of arsenic contained in copper concentrates and other materials with high arsenic content, the subject of the present application, has not been reported in literature and is therefore capable of being patented as novel, having significant inventiveness and industrial application.

Figure 1:
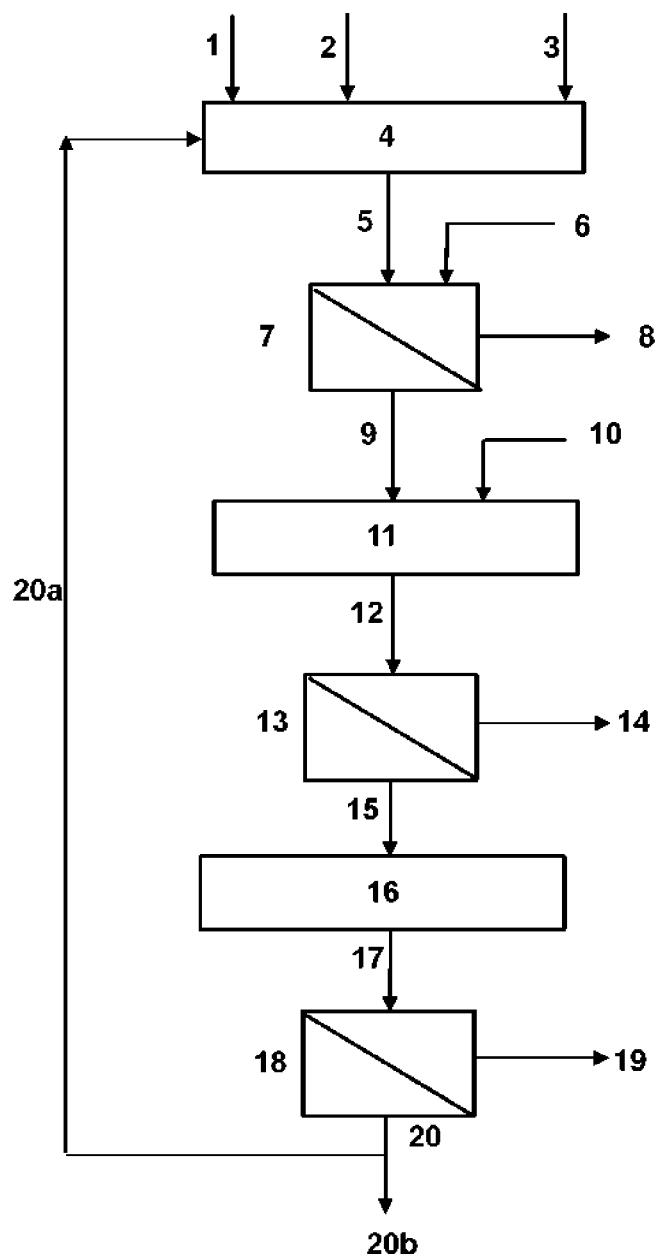
FIG. 1: A schematic flow diagram of the process of the present application, in which the arsenic compounds are selectively solubilized for the removal of contained arsenic by lixiviation under pressure through the action of a fresh alkaline solution and a recycled solution coming from the sodium sulfate filtration step.
Figure 2:
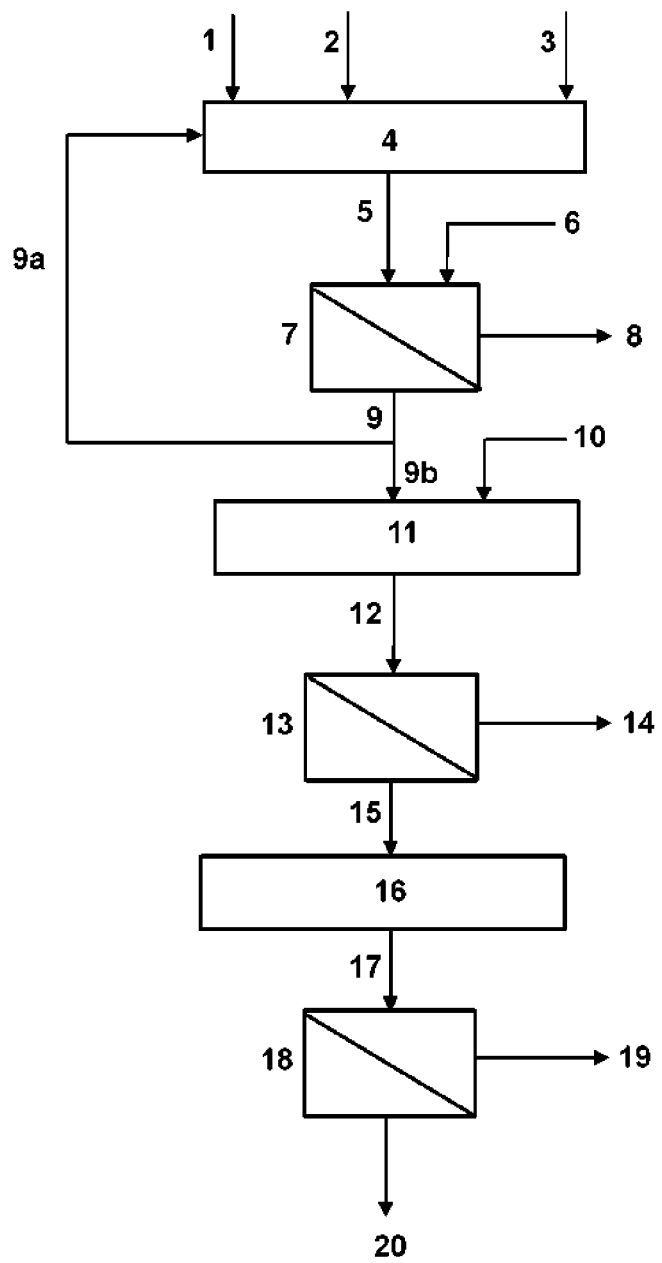
FIG. 2: A schematic flow diagram of an alternative, equally satisfactory, configuration of the process of the present application in which the liquors with solubilized arsenic are recirculated to be used in the alkaline lixiviation step and a purge is set up for treatment to remove the arsenic and crystallize $Na_2SO_4$. The final solution is process water to be recirculated to the plant.
Figure 3:
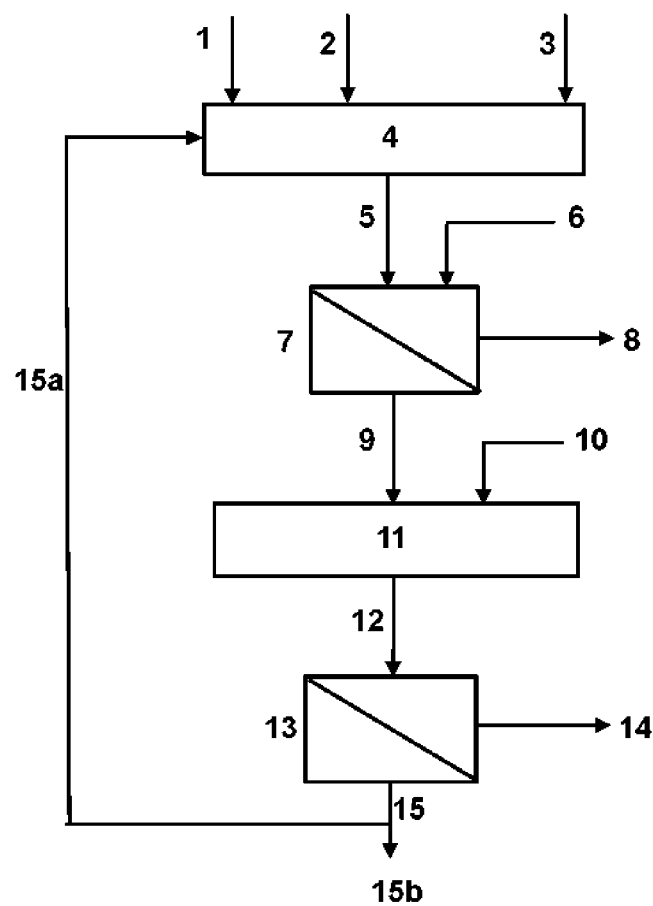
FIG. 3: A schematic flow diagram of an alternative, equally satisfactory, configuration of the present application in which the liquors with solubilized arsenic are treated to remove the arsenic and are then recirculated to be used in the alkaline lixiviation step. A purge is set up to remove the excess $Na_2SO_4$.

The diagrams shown in FIGS. 1, 2 and 3 are equally valid for materials that contain arsenic and/or selenium. Selenium follows the same route as the arsenic insofar as it is present in the solutions. The removal methods leave it in the same precipitates as the arsenic.

DETAILED DESCRIPTION OF THE INVENTION

The present application refers to a process for the selective removal of arsenic from copper concentrates and other materials with high arsenic content. The present application also refers to the selective removal of arsenic and/or selenium from materials with high arsenic and/or selenium content. The present application also comprises the precipitation of arsenic and/or selenium from the resulting alkaline solutions for its safe and environmentally sustainable disposal. The complete process (removal and precipitation) is based on experimental results on laboratory and pilot scale, and also considers technical aspects and industrial criteria for its scale-up.

Three block diagrams and a detailed description of each step of the process are presented. The first figure shows the general process of selective removal and precipitation of arsenic; FIGS. 2 and 3 show equally satisfactory alternatives for performing the process. Numerical references are included during the description of the process of the invention, as applicable. The same numerical references will be used to indicate the same steps or flows in the figures.

The present application proposes a process for the selective removal of arsenic from copper concentrates and other materials with high arsenic content, and from other materials that contain said element. The present application also refers to the selective removal of arsenic and/or selenium from materials with high arsenic and/or selenium content. This process also describes steps to treat the arsenic and/or selenium removed from the starting material in such a way as to obtain two main products: a solid material with a low level of arsenic and/or selenium and another solid material with a high percentage of arsenic and/or selenium that forms part of a compound that is stable from the environmental point of view, allowing its safe disposal in duly authorized sites.

The preferred material to be treated is a copper concentrate, without prejudice to the fact that the process is also applicable to copper cement and smelting and/or toasting filter powders (sulfides, oxides, metal or other) with high arsenic content that contain arsenic in concentrations higher than 0.5% by dry weight.

For the case of copper concentrates, the arsenic compounds are preferably enargite ($Cu_3AsS_4$) and tennantite ($Cu_{12}As_4S_{13}$). In addition to copper sulfides and arsenic compounds, the copper concentrate may contain iron sulfides, silica, alumina, feldspars and similar compounds.

The process of the present application comprises a lixiviation step under pressure in a pressure reactor (4), which involves the contact of the material to be lixiviated (1) with an alkaline lixiviating solution of NaOH (2) in an oxidizing atmosphere (3), which dissolves the arsenic from the material to produce a pulp (5) that contains the liquor with dissolved arsenic and the solid material with low arsenic content.

The reagents are fed into the lixiviation step (4) by re-pulping the copper concentrate or other material that contains a high arsenic content (1) with the alkaline lixiviating solution of NaOH (2). It must be ensured that the pulp generated is as homogeneous as possible to maintain the specific percentage of solid for the lixiviation step (4), preferably 10-40% by weight.

The lixiviation step (4) of the material (1) comprises the dissolution of arsenic preferably in the form of arsenate ($AsO_4^{3-}$) as a soluble anion in the pulp (5) obtained in the lixiviation step.

In the case of treatment of copper concentrates that contain enargite and/or tennantite, the chemical reactions that describe the phenomenon that occurs in the lixiviation step (4) are the following:

$$Cu_3AsS_4+8NaOH+5O_2=1.5Cu_2S+Na_3AsO_4+2.5Na_2SO_4+4H_2O \quad (I)$$

$$Cu_3AsS_4+5NaOH+2.75O_2=3CuS+Na_3AsO_4+Na_2SO_4+2.5H_2O \quad (II)$$

$$Cu_{12}As_4S_{13}+26NaOH+15.5O_2(g)=6Cu_2S+4Na_3AsO_4+7Na_2SO_4+13H_2O \quad (III)$$

$$Cu_{12}As_4S_{13}+14NaOH+6.5O_2(g)=12CuS+4Na_3AsO_4+Na_2SO_4+7H_2O \quad (IV)$$

The above chemical reactions are based on the formation of arsenate ($AsO_4^{3-}$) and copper sulfides. Nevertheless, there are chemical reactions that will also show formation of $AsO_4^{3-}$ while forming copper oxide (CuO) instead of copper sulfides. As the thermodynamic data for the compounds taking part in these chemical reactions (enargite, tennantite and sodium arsenate) are not known, the occurrence of reactions forming arsenate and copper sulfides could only be confirmed experimentally. The mechanism by which CuO would be formed instead of CuS is the following:

$$Cu_3AsS_4+11NaOH+8.75O_2=3CuO+Na_3AsO_4+4Na_2SO_4+5.5H_2O \quad (V)$$

$$Cu_{12}As_4S_{13}+38NaOH+30.5O_2(g)=12CuO+4Na_3AsO_4+13Na_2SO_4+19H_2O \quad (VI)$$

The caustic soda used in the process also dissolves the gangue from the concentrate, as is shown in the following reactions:

$$SiO_2+2NaOH=Na_2SiO_3+H_2O \quad (VII)$$

$$KAlSi_3O_8+6NaOH=KOH+Al(OH)_3+3Na_2SiO_3+H_2O \quad (VIII)$$

The process is also applicable to other materials (1) that contain arsenic in the form of sulfides or oxides, such as copper cements with high arsenic sulfide content and filter powders from smelting or toasting containing sulfides and oxides of arsenic.

The conversion of these chemical reactions will depend on factors such as the residence time of the pulp within the equipment, the temperature, pressure and quantity of reagent.

The present invention comprises a step subsequent to the lixiviation (4) which is considered to be a first solid-liquid separation step (7) of the liquor containing dissolved arsenic (9) from the solid with low arsenic content (8).

In accordance with Alternative 1, presented in FIG. 1, the process comprises a step (11) that involves the precipitation of the arsenic dissolved in the liquors (mother liquor and wash liquor, if applicable) using a precipitating agent (10), forming a precipitate (12) that is a stable compound for disposal.

In accordance with Alternative 1, the process may include a second solid-liquid separation step (13), separating the precipitated solid arsenic compound (14) from the alkaline liquors (15). This step leads to a solid arsenic compound that is stable for disposal (14).

In the process described above, silica dissolved as sodium silicate co-precipitates to form part of the solid arsenic precipitate.

Following the second solid-liquid separation step (7), Alternative 1 comprises a step consisting of an $Na_2SO_4$ crystallization process (16) from the alkaline liquors and a third solid-liquid separation step (18) of the product from the crystallization step (17). In this third solid-liquid crystallization step (18), a solid formed of $Na_2SO_4$ crystals (19) and an alkaline liquor (20) are obtained. The latter may in certain cases be used in part (20a) or in its entirety as a feed for the lixiviation step as a recycled solution.

The lixiviation step (4) may be supplied with a recycled solution (20a) or with fresh alkaline solution (2). As the recycled solution may be used in part (20a) or in its entirety (20) to feed into the lixiviation step, any part that is not recirculated to the lixiviation step can be used as process water (20b).

The lixiviating liquor in the present invention is based on sodium hydroxide as the main alkaline component. Nevertheless, other alkaline compounds can also be used, such as, for example, potassium hydroxide.

The sodium hydroxide content in the lixiviating liquor (2) depends on the arsenic content of the material to be lixiviated (1). In this way, the dose of NaOH to perform the lixiviation (4) corresponds to a value of 1.87-45 kg NaOH/ kg As contained in the material.

The temperature used in the lixiviation step (4) is in the range of 100-220° C. For this reason, the lixiviation step (4) must be carried out in equipment suitable for such an operation, e.g., an autoclave. The operative basis of the autoclave(s) in this invention may be batch or continuous. The autoclave in itself may have various designs, e.g., horizontal or vertical; regardless, in all these designs the autoclave may have one or more stirrers, with one or more compartments separated by baffles, with submerged or overhead injection of gas or both.

Furthermore, the lixiviation step (4) must be carried out with an oxidizing gas (3) feed. The oxidizing gas (3) may be pure oxygen, enriched air or air. In the case of this invention, it is been found that the oxidizing gas (3) is preferably air, as this allows a better control of the reduction potential of the solution so that the dissolved arsenic remains in the domain of stability for arsenate. This facilitates its removal as a stable compound, and also allows the dissolution of arsenic to be increased while reducing the solubilization of copper, gold and silver.

The overpressure of oxidizing gas (3) depends on the objectives of the process, which are: the removal of arsenic from the solid to a final concentration of less than or equal to 0.5%; the maintenance of the arsenic in the liquors in the form of arsenate ($As^{5+}$); and the non-dissolution of copper, gold, silver and/or other valuable metals. For the case of the correct operation of the lixiviation step (4) of the present invention, the overpressure must be in the range of 0-100 psig (0-689.5 kPa). If air is used, the overpressure is preferentially in the range of 10-40 psig (68.95-275.8 kPa), more preferentially around 20 psig (137.9 kPa).

The pulp (5) formed by the lixiviating liquor (2) and the solid material (1) in the lixiviation step (4) must preferably have a solid content in the range of 10-40% by weight, this solid-liquid ratio being available as the result of the combination of available technology and know-how.

The residence time of the pulp within the reactor must be sufficient for the chemical reactions to occur correctly. It has been found that good arsenic lixiviation results are obtained with residence times in the range of 30-150 minutes. With longer residence times within the range mentioned above, the product obtained has levels of arsenic lower than 0.5%. This enables mixtures to be made with materials with high arsenic levels, thereby obtaining a new material with an arsenic level acceptable for subsequent industrial processes.

The process of the present application can be used to treat copper concentrates and any type of material with a high arsenic content (1). This includes materials such as ores, concentrates, copper cements, filter powders from smelting and/or roasting and/or similar materials. The process of the present invention gives good results for arsenic removal from these materials with high arsenic content.

In this document, "good results for arsenic removal" and "arsenic levels acceptable for subsequent industrial processes" mean that the solid obtained from the process of the invention contains at most 0.5% arsenic by dry weight.

Depending on the operational values used in the lixiviation step (4) mentioned above, formation of the arsenate ion ($AsO_4^{3-}$) is possible. This is dissolved in the alkaline solution (2), mainly due to the conditions of pH and potential of the liquor that allow this. The pH of the pulp (5) resulting from the lixiviation step (4) is in a range of 10-14, while the redox potential of this alkaline solution is higher than −0.5 V with respect to the SHE.

The process of the present invention is effective in the removal of arsenic and can also dissolve other elements such as selenium and silicon, but not elements of interest such as copper, silver and gold.

With respect to the first solid-liquid separation step (7), any solid-liquid separation process can be used for the separation of the solid product with low arsenic content (8) from the alkaline liquor with high arsenic content (9). Commonly used techniques include: filtration, sedimentation, clarification, thickening, centrifugation, dewatering and decantation. The selection of the solid-liquid separation technique is not critical for the success of the present invention.

Once the solid product with low arsenic content (8) has been separated from the mother liquor with high arsenic content (10), an optional washing of the solid product with washing water (7) can be carried out to remove the impregnated mother liquor therein. Finally the solid product obtained (9) can be stored or conveyed to another process for recovery of its valuable components.

The mother liquor and the wash liquor (10) obtained from the first solid-liquid separation step (8) must be treated to remove their arsenic content. This removal is carried out through an arsenic precipitation step (12). The means of precipitating the arsenic contained in the liquors, which is preferably in the form of arsenate ($AsO_4^{3-}$), is to add reagents (11) for the precipitation thereof and then to separate it in a second solid-liquid separation step (14). The precipitation agents (11) used in the arsenic precipitation step (12) are $Ce^{3+}$, $Fe^{3+}$ and $Mg^{2+}$, and the combination of $Fe^{3+}$ and $Ca^{2+}$. There are also other reagents, such as $Al^{3+}$, that can also fulfill the function of precipitating the arsenic.

When the precipitating agent (11) is $Ce^{3+}$, the reagent used can be cerium chloride ($CeCl_3$). The chemical reaction that explains this precipitation is the following:

$$Na_3AsO_4 + CeCl_3 = CeAsO_4 + 3NaCl \quad (IX)$$

The dose of $CeCl_3$ in the precipitation solution corresponds to a value of 1.80-7.50 kg Ce/kg As. The conditions for carrying out this precipitation are preferably a pH of 6-12, more preferably 8-10. The pH value may be preferably adjusted with $H_2SO_4$. The results show a precipitation of arsenic greater than 99.16%.

When the precipitating agent (11) is $Fe^{3+}$, the reagent used can be ferric sulfate ($Fe_2(SO_4)_3$). The chemical reaction that explains this precipitation is the following:

$$2Na_3AsO_4 + Fe_2(SO_4)_3 = 2FeAsO_4 + 3Na_2SO_4 \quad (X)$$

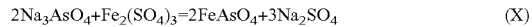

The dose of $Fe_2(SO_4)_3$ in the precipitation solution corresponds to a value of 0.70-8.0 kg $Fe^{3+}$/kg As. The conditions for carrying out this precipitation are preferably a pH of 6-10, more preferably 7-8. The pH value may be preferably adjusted with $H_2SO_4$. The results show a precipitation of arsenic greater than 99.31%.

When using ferric sulfate, there is a possibility of adding it directly or preparing it in advance using iron(II,III) oxide and sulfuric acid in accordance with the following chemical reaction:

$$Fe_3O_4 + 4H_2SO_4 = Fe_2(SO_4)_3 + FeSO_4 + 4H_2O \quad (XI)$$

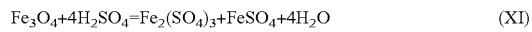

Additionally, the ferric sulfate can be prepared from ferrous sulfate by mixing it with $H_2O_2$ or other oxidant, sulfuric acid and hot water.

$$2FeSO_4 + H_2O_2 + H_2SO_4 = Fe_2(SO_4)_3 + 2H_2O \quad (XII)$$

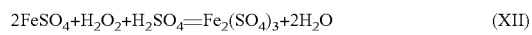

Furthermore, milk of lime may be added to the system formed by the ferric solution and the arsenate to obtain a mixed Fe—Ca—As salt. If the option of arsenic precipitation with iron and calcium is used, the doses are 0.70-8.0 kg $Fe^{3+}$/kg As and 0.5-2.5 kg $Ca^{2+}$/kg As. The conditions for carrying out this precipitation are preferably a pH of 6-10, more preferably 7-8. The pH value may be preferably adjusted with $H_2SO_4$. The results show a precipitation of arsenic greater than 99.09%.

When the precipitating agent (11) is $Mg^{2+}$, the reagent used can be magnesium sulfate ($MgSO_4$). The chemical reaction that explains this precipitation is the following:

$$3MgSO_4 + 2Na_3AsO_4 = 3Na_2SO_4 + Mg_3(AsO_4)_2 \quad (XIII)$$

The dose of $MgSO_4$ in the precipitation solution corresponds to a value of 0.45-1.50 kg $Mg^{2+}$/kg As. The conditions for carrying out this precipitation are a pH in the range of 7-14, preferably a pH in the range of 8-12 and more preferably a pH of around 10: the pH value may preferably be adjusted with $H_2SO_4$. The results show a maximum precipitation of arsenic of 71.39%.

In this way, in the second solid-liquid separation step (14), the solid arsenic compound (15) must be separated from the alkaline liquor (16) that is already free of arsenic. This will be carried out by a conventional solid-liquid separation technique, such as those already mentioned for the first solid-liquid separation step.

Once the filtrate has been obtained from the second solid-liquid separation step (14), which corresponds to an alkaline liquor free of arsenic (16), a crystallization step (17) to crystallize the $Na_2SO_4$ dissolved in this alkaline liquor is carried out. The process to crystallize $Na_2SO_4$ from this alkaline liquor is not critical to the success of the present invention and conventional methods can be used such as constant-volume evaporation (either continuous or semi-continuous), batch evaporation (crystallization by cooling or the total evaporation of solvent) or evaporation in a solar pond.

Once the pulp composed of $Na_2SO_4$ crystals (18) and an alkaline liquor free of $Na_2SO_4$ have formed, a third solid-liquid separation step (19) of the pulp (18) formed in the crystallization step (17) is carried out. In this third solid-liquid crystallization step (19), a solid formed of $Na_2SO_4$ crystals (20) and an alkaline liquor (21) are obtained. The latter may be reused in part (21a) as the lixiviating solution for the lixiviation (5) of materials with high arsenic levels (1).

Up to 100% of the alkaline lixiviating solution free of arsenic (21) is recycled to be used in the lixiviation step (5). In accordance with the above, the lixiviation step (5) can be configured to work as an open or closed circuit, the latter involving the recirculation of alkaline lixiviating liquor (21).

It should be taken into account that the liquor (21b) that is not recirculated to the lixiviation step (5) may have its arsenic level further reduced through a secondary step such as adsorption or ion exchange.

In another, equally satisfactory configuration of the process, defined as Alternative 2 and shown in FIG. 2, the alkaline lixiviation pulp (6) undergoes an initial solid-liquid separation step (8), and a fraction of the filtrate (10a) is recirculated to the alkaline lixiviation (5) to use the contained sodium hydroxide. The other fraction (10b) (purge) is sent to the arsenic precipitation process (12) and a second solid-liquid separation step (14). The new filtrate (16) undergoes a sodium sulfate recovery process through crystallization (17) or another similar process. The pulp (18) formed in the crystallization step (17) undergoes a third solid-liquid separation step (19); the filtrate from this last step (21) is used as process water for recirculation in the plant.

The criterion for scheduling the purge is based on the control of the sodium sulfate saturation to prevent its crystallization in the alkaline lixiviation reactor, whether the process is carried out in batch or continuous mode.

In another, equally satisfactory configuration of the process, defined as Alternative 3 and shown in FIG. 3, the alkaline lixiviation pulp (6) undergoes an initial solid-liquid separation step (8) and the filtrate (10) is sent to the arsenic precipitation process (12), then to a second solid-liquid separation step (14). A fraction (16a) of the new filtrate is recirculated to the alkaline lixiviation (5) and the other fraction (16b) (purge) undergoes a process of sodium sulfate recovery by crystallization or other similar process, or is discarded.

The criterion for scheduling the purge is based on the control of the sodium sulfate saturation to prevent its crystallization in the alkaline lixiviation reactor, whether the process is carried out in batch or continuous mode.

These process descriptions are also applicable to materials that contain arsenic and/or selenium. If selenium is present, it follows the same route as the arsenic insofar as it is present in the solutions. The removal methods leave it in the same precipitates as the arsenic.

EXAMPLES

Example 1. Lixiviation with Pure Oxygen. Study of the NaOH Dose and the Liquid-Solid Ratio In this example are shown the experimental trials carried out to define the NaOH dose necessary for the lixiviation step for a copper concentrate with 31.6% copper and an arsenic content of 2.75% as enargite. Once the dose necessary for the lixiviation of arsenic was obtained, the influence of the percentage of solid in the pulp on the efficiency of arsenic extraction was studied. The temperature, residence time, and oxygen overpressure were kept constant throughout these trials.

|  |  | Trials | | | | | | |
| --- | --- | --- | --- | --- | --- | --- | --- | --- |
|  | Units | 1 | 2 | 3 | 4 | 5 | 6 | 7 |
| Variables |  |  |  |  |  |  |  |  |
| Liquid-solid ratio | mL/g | 2 | 2 | 2 | 3 | 4 | 6 | 10 |
| Lixiviating reagent | *** | NaOH | NaOH | NaOH | NaOH | NaOH | NaOH | NaOH |
| Dose of lixiviating reagent | kg/kg As | 22.2 | 19.05 | 7.61 | 22.2 | 22.2 | 22.2 | 22.2 |
| Lixiviation temperature | °C. | 160 | 160 | 160 | 160 | 160 | 160 | 160 |
| Oxidizing gas | *** | $O_2$ | $O_2$ | $O_2$ | $O_2$ | $O_2$ | $O_2$ | $O_2$ |
| Overpressure of oxidizing gas | psig | 80 | 80 | 80 | 80 | 80 | 80 | 80 |
|  | kPa | 551.6 | 551.6 | 551.6 | 551.6 | 551.6 | 551.6 | 551.6 |
| Results |  |  |  |  |  |  |  |  |
| Arsenic removal | % | 98.7 | 80.7 | 53.3 | 96.4 | 82.8 | 74.1 | 47.6 |

It is concluded from this example that the optimum dose of NaOH is 22.2 kg NaOH/kg As contained in the copper concentrate. The liquid-solid ratio that gives the best results in this example is between 2/1 and 4/1.

Example 2. Lixiviation with Pure Oxygen. Study of the Process Kinetics

This example shows the experimental trials carried out with the aim of studying the arsenic dissolution kinetics from the same copper concentrate as in example 1. The temperature, solid-liquid ratio of the pulp, and oxygen overpressure were kept constant throughout these trials.

|  |  | Trials | | | | |
| --- | --- | --- | --- | --- | --- | --- |
|  | Units | 8 | 9 | 10 | 11 | 12 |
| Variables |  |  |  |  |  |  |
| Arsenic in initial solid | % | 2.8 | 2.8 | 2.8 | 2.8 | 2.8 |
| Lixiviating reagent | *** | NaOH | NaOH | NaOH | NaOH | NaOH |
| Lixiviation temperature | °C. | 160 | 160 | 160 | 160 | 160 |

-continued

|  | Units | Trials | | | | |
|---|---|---|---|---|---|---|
|  |  | 8 | 9 | 10 | 11 | 12 |
| Lixiviation time | Minutes | 30 | 60 | 120 | 150 | 180 |
| Oxidizing gas | *** | O$_2$ | O$_2$ | O$_2$ | O$_2$ | O$_2$ |
| Overpressure of oxidizing gas | psig | 80 | 80 | 80 | 80 | 80 |
|  | kPa | 551.6 | 551.6 | 551.6 | 551.6 | 551.6 |
| Results |  |  |  |  |  |  |
| Arsenic in final solid | % | 0.7 | 0.5 | 0.5 | 0.3 | 0.2 |
| Arsenic removal | % | 75.5 | 81.5 | 82.8 | 88.6 | 92.6 |

It is concluded from this example that good results are achieved with a lixiviation time of 60-180 minutes.

Example 3. Recycling Study

In these trials, the effect of the use of liquors generated in previous trials (Trials 11 and 12 respectively) for the dissolution of arsenic from a copper concentrate (in Trials 13 and 14 respectively) was studied. The temperature, the residence time, the solid-liquid ratio of the pulp, and the oxygen overpressure were kept constant throughout these trials, and the concentration of sodium hydroxide was fixed by Trials 11 and 12.

|  | Units | Trials | |
|---|---|---|---|
|  |  | 13 | 14 |
| Variables |  |  |  |
| Arsenic in initial solid | % | 2.8 | 2.8 |
| Liquid-solid ratio | mL/g | 4 | 4 |
| Volume of recycled mother liquor | % | 67 | 18 |
| Volume of recycled wash liquor | % | 16 | 7 |
| Volume of fresh lixiviating solution | % | 17 | 75 |
| Lixiviation temperature | ° C. | 160 | 160 |
| Oxidizing gas | *** | O$_2$ | O$_2$ |
| Overpressure of oxidizing gas | psig | 80 | 80 |
|  | kPa | 551.6 | 551.6 |
| Results |  |  |  |
| Arsenic in final solid | % | 0.4 | 0.4 |
| Arsenic removal | % | 86.8 | 85.2 |

This example shows that a recycled solution can be used efficiently.

Example 4. Process Study with Copper Concentrate of Different Mineralogy and with a Higher Arsenic Content In this example, the experimental trials carried out to verify the efficiency of arsenic dissolution in the process are shown. The material is a copper concentrate with 19.7% copper and 6.11% arsenic as tennantite. The oxygen overpressure was kept constant throughout these trials.

|  | Units | Trials | | |
|---|---|---|---|---|
|  |  | 15 | 16 | 17 |
| Variables |  |  |  |  |
| Arsenic in initial solid | % | 6.1 | 6.1 | 6.1 |
| Liquid-solid ratio | mL/g | 5 | 4 | 4 |

-continued

|  | Units | Trials | | |
|---|---|---|---|---|
|  |  | 15 | 16 | 17 |
| Lixiviating reagent | *** | NaOH | NaOH | NaOH |
| Lixiviation temperature | ° C. | 160 | 160 | 220 |
| Lixiviation time | Minutes | 150 | 240 | 240 |
| Oxidizing gas | *** | O$_2$ | O$_2$ | O$_2$ |
| Overpressure of oxidizing gas | psig | 80 | 80 | 80 |
|  | kPa | 551.6 | 551.6 | 551.6 |
| Results |  |  |  |  |
| Arsenic in final solid | % | 3.4 | 2.8 | 0.5 |
| Arsenic removal | % | 48.8 | 60.0 | 92.3 |

This example shows that the process is also efficient for a material that contains arsenic in the form of tennantite.

Example 5. Lixiviation of Copper Concentrates with Pure Oxygen. Study of the Dissolution of Copper, Gold and Silver The trial in this example was carried out under non-optimum conditions for arsenic removal and the dissolution of copper, gold and silver; it shows the selectivity of the process and the low values for dissolution of copper, gold and silver that can be obtained.

|  | Units | Trial 18 |
|---|---|---|
| Variables |  |  |
| Arsenic in initial solid | % | 2.05 |
| Liquid-solid ratio | mL/g | 4 |
| Lixiviating reagent | *** | NaOH |
| Dose of lixiviating reagent | kg/kg As | 22.2 |
| Lixiviation temperature | ° C. | 160 |
| Lixiviation time | min | 150 |
| Oxidizing gas | *** | O$_2$ |
| Overpressure of oxidizing gas | psig | 40 |
|  | kPa | 275.8 |
| Results |  |  |
| Arsenic removal | % | 82.3 |
| Copper removal | % | 0.05 |
| Gold removal | % | 3.99 |
| Silver removal | % | 0.31 |

This example shows that the dissolution of copper is insignificant and that the dissolution of gold and silver is very low.

Example 6. Lixiviation with Air. Study of the Effect of the Working Pressure In this example, the use of air instead of pure oxygen as the oxidizing agent was studied. The use of pure oxygen at an industrial level presents a series of difficulties that make the process and the investment more expensive, such as complex plants and a finer control of the operation.

In this example are shown the experimental trials on a copper concentrate with 27.6% copper and an arsenic content of 2.1% as enargite.

It was carried out to verify the efficiency of arsenic dissolution when the working overpressure is varied. The temperature, residence time, and solid-liquid ratio in the pulp were kept constant in this study.

|  |  | Trials | | | |
|---|---|---|---|---|---|
|  | Units | 19 | 20 | 21 | 22 |
| Variables |  |  |  |  |  |
| Arsenic in initial solid | % | 2.1 | 2.1 | 2.1 | 2.1 |
| Liquid-solid ratio | mL/g | 4 | 4 | 4 | 4 |
| Lixiviating reagent | *** | NaOH | NaOH | NaOH | NaOH |
| Lixiviation temperature | ° C. | 160 | 160 | 160 | 160 |
| Oxidizing gas | *** | Air | Air | Air | Air |
| Overpressure of oxidizing gas | psig | 80 | 40 | 20 | 10 |
|  | kPa | 551.6 | 275.8 | 137.9 | 68.9 |
| Results |  |  |  |  |  |
| Arsenic in final solid | % | 0.4 | 0.3 | 0.2 | 0.3 |
| Arsenic removal | % | 82.8 | 87.8 | 91.1 | 86.0 |

This example shows that the process operates satisfactorily over the entire overpressure range studied.

Example 7. Lixiviation with Air. Study of the Process Kinetics

This example shows the experimental trials carried out with the aim of studying the arsenic dissolution kinetics using air as the oxidizing gas and the same copper concentrate as in example 5. The temperature, solid-liquid ratio of the pulp, and air overpressure were kept constant in these trials.

|  |  | Trials | | | | | |
|---|---|---|---|---|---|---|---|
|  | Units | 23 | 24 | 25 | 26 | 27 | 28 |
| Variables |  |  |  |  |  |  |  |
| Arsenic in initial solid | % | 2.1 | 2.1 | 2.1 | 2.1 | 2.1 | 2.1 |
| Liquid-solid ratio | mL/g | 4 | 4 | 4 | 4 | 4 | 4 |
| Lixiviating reagent | *** | NaOH | NaOH | NaOH | NaOH | NaOH | NaOH |
| Lixiviation temperature | ° C. | 160 | 160 | 160 | 160 | 160 | 160 |
| Lixiviation time | Minutes | 30 | 60 | 90 | 120 | 150 | 180 |
| Oxidizing gas | *** | Air | Air | Air | Air | Air | Air |
| Overpressure of oxidizing gas | psig | 20 | 20 | 20 | 20 | 20 | 20 |
|  | kPa | 137.9 | 137.9 | 137.9 | 137.9 | 137.9 | 137.9 |
| Results |  |  |  |  |  |  |  |
| Arsenic in final solid | % | 0.9 | 0.5 | 0.3 | 0.2 | 0.2 | 0.1 |
| Arsenic removal | % | 60.4 | 78.3 | 84.4 | 91.2 | 92.4 | 95.7 |

It is concluded from this example that good results are achieved with a lixiviation time of 60-180 minutes using air as the oxidizing gas.

Example 8. Copper Cement

This example shows a trial of arsenic dissolution from a copper cement containing 62% Cu, 0.63% Se and 2.40% As as arsenic sulfide (initial solid). The objective of this trial was to verify the effectiveness of the process for a material other than copper concentrate and with an additional contaminant (Se). As can be seen, the trial was carried out according to the following parameters:

|  | Units | Trial 29 |
|---|---|---|
| Variables |  |  |
| Arsenic in initial solid | % | 2.4 |
| Se in initial solid | % | 0.6 |
| Cu in initial solid | % | 62 |
| Liquid-solid ratio | mL/g | 4 |
| Lixiviating reagent | *** | NaOH |
| Lixiviation temperature | ° C. | 160 |
| Oxidizing gas | *** | Air |
| Overpressure of oxidizing gas | psig | 20 |
|  | kPa | 137.9 |
| Results |  |  |
| Arsenic in final solid | % | 0.1 |
| Arsenic removal | % | 95.4 |
| Se in final solid | % | 0.05 |
| Selenium removal | % | 93.7 |
| Cu in final solid | % | 72.1 |
| Copper removal | % | 0.05 |

In this example, in which the final solid corresponds to the initial solid already treated by the process of the present invention, it is shown that the process effectively removes both arsenic and selenium from the copper cement and that the dissolution of copper is insignificant with respect to the selective lixiviation of arsenic and selenium.

Example 9. Smelting Filter Powders

This example shows a trial of arsenic dissolution from a filter powder from smelting of copper concentrate containing 25.4% Cu and 7.3% As. The objective of this trial was to verify the effectiveness of the process for a material other than copper concentrate in which the arsenic is mainly present as its oxide. As can be seen, the trial was carried out according to the following parameters:

|  | Units | Trial 30 |
|---|---|---|
| Variables |  |  |
| Arsenic in initial solid | % | 7.3 |
| Liquid-solid ratio | mL/g | 4 |
| Lixiviating reagent | *** | NaOH |
| Lixiviation temperature | ° C. | 160 |
| Oxidizing gas | *** | Air |
| Overpressure of oxidizing gas | psig | 20 |
|  | kPa | 137.9 |
| Results |  |  |
| Arsenic in final solid | % | 0.3 |
| Arsenic removal | % | 94.2 |

This example shows that the process is also satisfactory for the removal of arsenic from smelting filter powders.

Example 10. Precipitation of Arsenic from Liquors Arising from the Removal of Arsenic from Materials To precipitate the arsenic from an alkaline solution arising from the removal of arsenic from a material, the variables to be monitored are: the precipitating reagent, its dose and the pH. The regulation of pH is carried out with NaOH or $H_2SO_4$. No temperature control was carried out during the process.

|  |  | Trial | | | |
|---|---|---|---|---|---|
| Variables | Units | 31 | 32 | 33 | 34 |
| As in initial solution | g/L | 2.35 | 2.35 | 2.35 | 2.35 |
| Precipitating reagent | *** | $Ce^{3+}$ | $Fe^{3+}$ | $Fe^{3+}$ and $Ca^{2+}$ | $Mg^{2+}$ |
| Initial temperature | ° C. | 25 | 25 | 25 | 25 |
| Results | | | | | |
| pH | | Arsenic removal | | | |
| 12 | | 52.89% | 36.31% | 51.89% | 44.20% |
| 11 | | 81.28% | 64.15% | 95.60% | 53.18% |
| 10 | | 99.16% | 77.06% | 91.13% | 71.39% |
| 9 | | 97.73% | 97.37% | 93.20% | 54.09% |
| 8 | | 99.73% | 99.31% | 99.09% | 44.47% |
| 7 | | 91.32% | 99.99% | 99.99% | 32.19% |

This example shows that it is possible to efficiently precipitate arsenic from alkaline liquors using various precipitating agents.

ADVANTAGES OF THE INVENTION

The present invention shows a complete process that allows:
1. The selective elimination of arsenic contained in copper concentrates and other materials that contain arsenic, with insignificant dissolution of copper (less than 0.1%) and also with a very low dissolution of gold and silver, leaving the concentrates and other materials in a condition to be used without violating current environmental regulations.
2. The dissolution of other contaminants such as selenium.
3. Relatively rapid kinetics (0.5-2.5 hours) compared to other processes described in the literature (4-8 hours).
4. The efficient precipitation of arsenic from liquors arising from alkaline lixiviation (with an efficiency greater than 99%), in the form of a stable compound that can be disposed of safely in authorized sites, in the form of scorodite or mixed salts of $As^{5+}$, $Fe^{3+}$ and $Ca^{2+}$.

The invention claimed is:

1. A process for the removal of arsenic from copper concentrates and/or copper cement with an arsenic content higher than 0.5% by dry weight or copper concentrates and/or copper cement with a high content of arsenic and selenium, comprising:
   adding the copper concentrates and/or copper cement to a pressure reactor;
   adding an alkaline leaching solution of a strong base selected from sodium hydroxide and potassium hydroxide dissolved in water to the pressure reactor;
   adding an oxidizing gas to the pressure reactor;
   mixing the above components in the pressure reactor to obtain a homogenous pulp and subjecting it to a pressure lixiviation that is selective for arsenic, wherein operation conditions of the pressure lixiviation are: temperature between 100° C. and 220° C., residence time of the pulp within the pressure reactor between 30 and 150 minutes, quantity of the leaching solution in the case of NaOH between 1.87 and 45.0 kg NaOH/kg As contained in the pulp, and oxidizing gas overpressure between 0 and 100 psig, wherein the dissolution of copper present in the copper concentrates and/or copper cement during said pressure lixiviation is less than 0.05% of the total copper, the dissolution of gold present in the copper concentrates and/or copper cement is less than 4% of the total gold and the dissolution of silver present in the copper concentrates and/or copper cement is less than 0.4% of the total silver;
   subjecting the pulp obtained from the pressure lixiviation to a first solid-liquid separation step thereby separating a solid with low arsenic content and a liquor containing dissolved arsenic in its +5 oxidation state in the form of arsenate;
   subjecting the liquor with dissolved arsenic to a precipitation of the arsenic with a precipitating agent that provides cations selected from $Ce^{3+}$, $Fe^{3+}$, $Mg^{2+}$, or a combination of $Fe^{3+}$ and $Ca^{2+}$, said precipitating agent being selected from cerium chloride, ferric sulfate, magnesium sulfate, or ferric sulfate with addition of lime milk;
   subjecting the product of the arsenic precipitation step to a second solid-liquid separation step, thereby obtaining a solid arsenic-containing product and an alkaline liquor free of arsenic.

2. The process for the removal of arsenic according to claim 1, further comprising:
   subjecting the alkaline liquor free of arsenic to a sodium sulfate ($Na_2SO_4$) crystallization step, thereby obtaining a pulp composed of $Na_2SO_4$ crystals and an alkaline liquor free of $Na_2SO_4$; and
   subjecting the product of the $Na_2SO_4$ crystallization step to a third solid-liquid separation step, thereby obtaining a solid comprising $Na_2SO_4$ crystals and an alkaline liquor.

3. The process for the removal of arsenic according to claim 2, wherein the alkaline liquor free of arsenic from the third solid-liquid separation step is partially or totally recirculated as part of the leaching solution of the pressure lixiviation, and the liquor that is not recirculated being subjected to a secondary arsenic elimination step of adsorption or ion exchange, or used as process water.

4. The process for the removal of arsenic according to claim 2, wherein a fraction of the liquor with dissolved arsenic from the first solid-liquid separation step is recirculated to the pressure lixiviation while the other fraction is sent to the arsenic precipitation step, and the alkaline liquor free of arsenic from the third solid-liquid separation step is used as process water for recirculation.

5. The process for the removal of arsenic according to claim 1, wherein a fraction of the alkaline liquor free of arsenic from the second solid-liquid separation step is recirculated to the pressure lixiviation while the other fraction is sent to an Na2SO4 crystallization step or sent to tailings.

6. The process for the removal of arsenic according to claim 2, wherein the $Na_2SO_4$ crystallization step comprises a technique selected from the group consisting of continuous evaporation at constant volume, semi-continuous evaporation at constant volume, cooling, total evaporation of solvent, and evaporation in a solar pond.

7. The process for the removal of arsenic according to claim 1, wherein the copper concentrates and/or copper cement to be treated also contains a high selenium content and the pressure lixiviation is selective for the dissolution of arsenic and selenium.

8. The process for the removal of arsenic according to claim 1, wherein the oxidizing gas is selected from pure oxygen, enriched air, or air.

9. The process for the removal of arsenic according to claim 1, wherein the pressure reactor is an autoclave, horizontal or vertical, with one or more stirrers, with one or more compartments separated by baffles, and with submerged or overhead injection of gas or both.

10. The process for the removal of arsenic according to claim 1, wherein the mixing step is carried out by a repulping of the copper concentrates and/or copper cement with the alkaline leaching solution, and homogenizing the pulp to keep the percentage of solid within a range of 10-40% by weight.

11. The process for the removal of arsenic according to claim 1, wherein when the oxidizing gas is air, the overpressure in the pressure reactor is 10-40 psig.

12. The process for the removal of arsenic according to claim 1, wherein the pulp resulting from the pressure lixiviation has a pH of 10-14 and a redox potential greater than −0.5 V vs. SHE.

13. The process for the removal of arsenic according to claim 1, wherein the solid-liquid separation steps are carried out by filtration, sedimentation, clarification, thickening, centrifugation, dewatering or decantation.

14. The process for the removal of arsenic according to claim 1, wherein the solid with low arsenic content obtained from the first solid-liquid separation step is further subjected to a wash, where said wash liquor is sent to the arsenic precipitation step together with the mother liquor, and the washed solid is stored, or sent to a process of recovery of the remaining valuable components therein.

15. The process for the removal of arsenic according to claim 1, wherein when the precipitating agent is $CeCl_3$, the dose of the agent is 1.80-7.50 kg $Ce^{3+}$/kg As and the precipitation is carried out at a pH of 6-12, and the pH is adjusted with $H_2SO_4$.

16. The process for the removal of arsenic according to claim 1, wherein when the precipitating agent is $Fe_2(SO_4)_3$, the dose of the agent is 0.70-8.0 kg $Fe^{3+}$/kg As and the precipitation is carried out at a pH of 6-10, and the pH is adjusted with $H_2SO_4$.

17. The process for the removal of arsenic according to claim 16, wherein the $Fe_2(SO_4)_3$ is added directly, or is previously prepared from iron (II and III) oxide with $H_2SO_4$ or from ferrous sulfate ($FeSO_4$) with $H_2O_2$, $H_2SO_4$ and hot water.

18. The process for the removal of arsenic according to claim 16, wherein additionally lime milk is added to the $Fe_2(SO_4)_3$ precipitating agent at a dose of 0.50-2.5 kg $Ca^{2+}$/kg As.

19. The process for the removal of arsenic according to claim 1, wherein when the precipitating agent is $MgSO_4$, the dose of the agent is 0.45-1.50 kg $Mg^{2+}$/kg As and the precipitation is carried out at a pH of 7-14, and the pH is adjusted with $H_2SO_4$.

* * * * *